United States Patent [19]
Tamura et al.

[11] Patent Number: 5,995,179
[45] Date of Patent: Nov. 30, 1999

[54] LIQUID CRYSTAL DISPLAY MODULE

[75] Inventors: Tetsuya Tamura; Jun Fujimoto; Masashi Tani; Tomoya Terasawa; Nobuhiro Iwano, all of Tokyo, Japan

[73] Assignee: NEC Corporation, Tokyo, Japan

[21] Appl. No.: 09/195,221

[22] Filed: Nov. 18, 1998

[30] Foreign Application Priority Data

Nov. 19, 1997 [JP] Japan ..................................... 9-318234

[51] Int. Cl.$^6$ ...................... G02F 1/1333; G02F 1/1347; G03F 1/133; H05K 5/00
[52] U.S. Cl. ................. 349/58; 349/73; 349/74; 361/681
[58] Field of Search ................................. 349/73, 74, 58; 361/681, 682

[56] References Cited

U.S. PATENT DOCUMENTS 3,851,119  11/1974  Tucker ..................................... 379/454
4,789,774  12/1988  Koch et al. ............................... 349/58

FOREIGN PATENT DOCUMENTS 2-275490  11/1990  Japan .
2-275491  11/1990  Japan .
4-292087  10/1992  Japan .

*Primary Examiner*—William L. Sikes
*Assistant Examiner*—Dung Nguyen
*Attorney, Agent, or Firm*—Sughrue, Mion, Zinn, Macpeak & Seas, PLLC

[57] ABSTRACT

A large scale LCD device has a plurality of LCD modules coupled together to form a single screen of the LCD panel. Each module has a plurality of top holes, bottom protrusions, left protrusions and right holes on respective sides of the module. The top hole has a longitudinal section and a transverse section for guiding the bottom protrusion in a horizontal direction for locking the bottom protrusion with the top hole. In the movement of the module for guiding the protrusion for locking operation, the left protrusions advance to the right holes to be received therein and locked with locking pins.

11 Claims, 10 Drawing Sheets

LIQUID CRYSTAL DISPLAY MODULE

BACKGROUND OF THE INVENTION (a) Field of the Invention

The present invention relates to a liquid crystal display module and, more particularly, to a liquid crystal display module having a structure for facilitating coupling and decoupling between modules.

(b) Description of the Related Art

As a display device for desktop personal computers, it is required to reduce the space therefor, to assure safety to users and to solve the earth environmental problems by replacing the CRT display devices having cathode-ray tubes with liquid crystal display (LCD) devices. In addition, the demand for a larger screen is increased due to the increase in the amount of information to be displayed on the screen for the personal computer.

It is difficult to fabricate a liquid crystal display panel having a screen size exceeding 1 $m^2$ (square meters) by using a single liquid crystal display device. For providing a larger screen of the liquid crystal display, a display device having a plurality of liquid crystal display modules coupled in the vertical and horizontal direction (referred to as "large screen display device", hereinafter) is studied and described in, for instance, JP-A-4(1992)-292087, JP-A-2-275490 and JP-A-2-275491.

FIG. 1 is a front view of a large screen display device described in JP-A-4-292087. The liquid crystal display module, in general, has a horizontal driver 52 and a vertical driver 54 for driving the liquid crystal display panel on the horizontal side and a vertical side of the panel, respectively. That is, when the liquid crystal display modules are coupled together, a non-display part exists between the adjacent liquid crystal display modules due to the existence of the horizontal driver 52 and the vertical driver 54 to deteriorate the continuity of the screen. JP-A-4-292087 proposes for solving the above problem, a liquid crystal display module having the horizontal driver 52 on a side wall and the vertical drivers 54 on the side wall adjacent to the horizontal drivers. Two liquid crystal display modules are connected to each other on the other side walls not having the horizontal driver 52 and the vertical drivers 54, thereby forming a single large screen display device similar to the display device shown in FIG. 1.

FIG. 2 is a front view of another large screen display device described in JP-A-2-275490. The display device has a plurality of frames 56 and a plurality of liquid crystal display modules 57 adhered to one another through the frame 56 by adhesive to implement a large screen display device. JP-A-2-275491 reduces the number of inlets for filling the liquid crystal into the liquid crystal panel as small as possible, to reduce the width of the non-display part for improving the structure described in JP-A-2-275490, thereby reducing the width of the lattice body.

When a large screen display device exhibits a failure, it is necessary to repair and exchange the defective parts such as a liquid crystal panel, a printed circuit board, or a driver. The large screen display device fabricated by using conventional liquid crystal display modules has a problem in that it requires a large amount of work for removing the defective liquid crystal display modules from the large screen display device to repair and exchange the defective module. In addition, when the liquid crystal display modules are assembled again after the repair and exchange of the parts, exact coupling of the connectors is difficult to achieve.

Moreover, since the liquid crystal display module is designed as a dedicated module for the large screen display device, the single module cannot be used as a liquid crystal display panel for a small sized personal computer by extracting the same from the large screen display device.

SUMMARY OF THE INVENTION

It is therefore an object of the present invention to provide a liquid crystal display module having a structure for facilitating coupling and decoupling between modules.

The present invention provide, in a first aspect thereof, a flat panel display module comprising a display panel and a support panel disposed for a rear side of the display panel for supporting the display panel, the support panel having a coupling mechanism including at least one first projection fixed onto a first side of the support panel and at least one first hole disposed on a second side of the support panel opposing the second side for receiving therein the first projection.

The present invention also provides, in a second aspect thereof, a large scale flat panel display device comprising a plurality of flat panel display modules each including a display panel and a support panel disposed for a rear side of the display panel for supporting the display panel, the support panel having a coupling mechanism including at least one first projection fixed onto a first side of the support panel and at least one first hole disposed on a second side of the support panel opposing the second side for receiving therein the first projection.

In accordance with the present invention, a large scale display panel having a desired size can be implemented by coupling a plurality of display modules in the horizontal or vertical direction, using the holes and protrusions disposed on the sides of the display modules.

PREFERRED EMBODIMENT OF THE INVENTION

Now, the present invention is described more specifically based on a preferred embodiment thereof with reference to the accompanying drawings.

Figure 1:
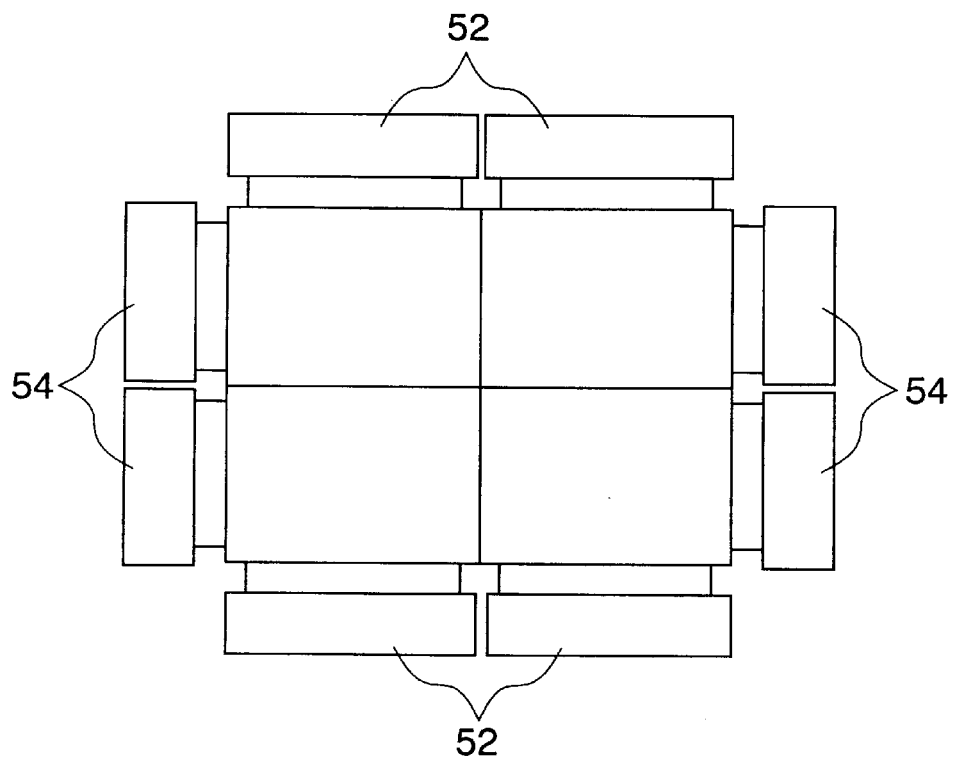
FIG. 1 is a front view of the conventional large screen display device described in JP-A-4-292087.
Figure 2:
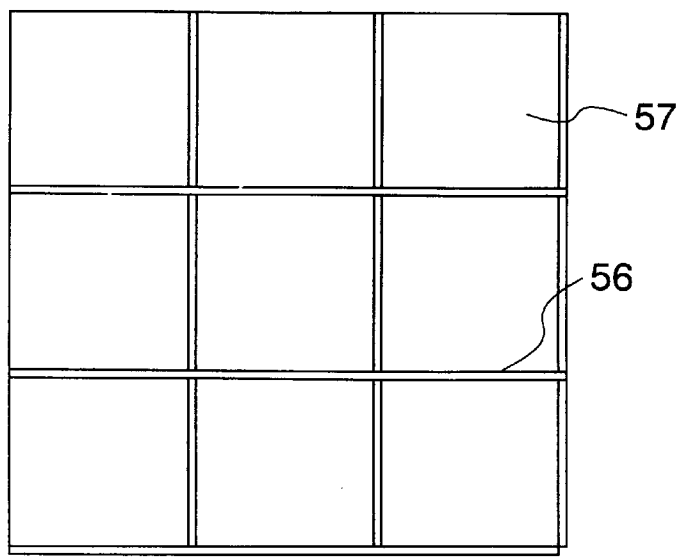
FIG. 2 is a front view of the conventional large screen display device described in JP-A-2-275490.
Figure 3:
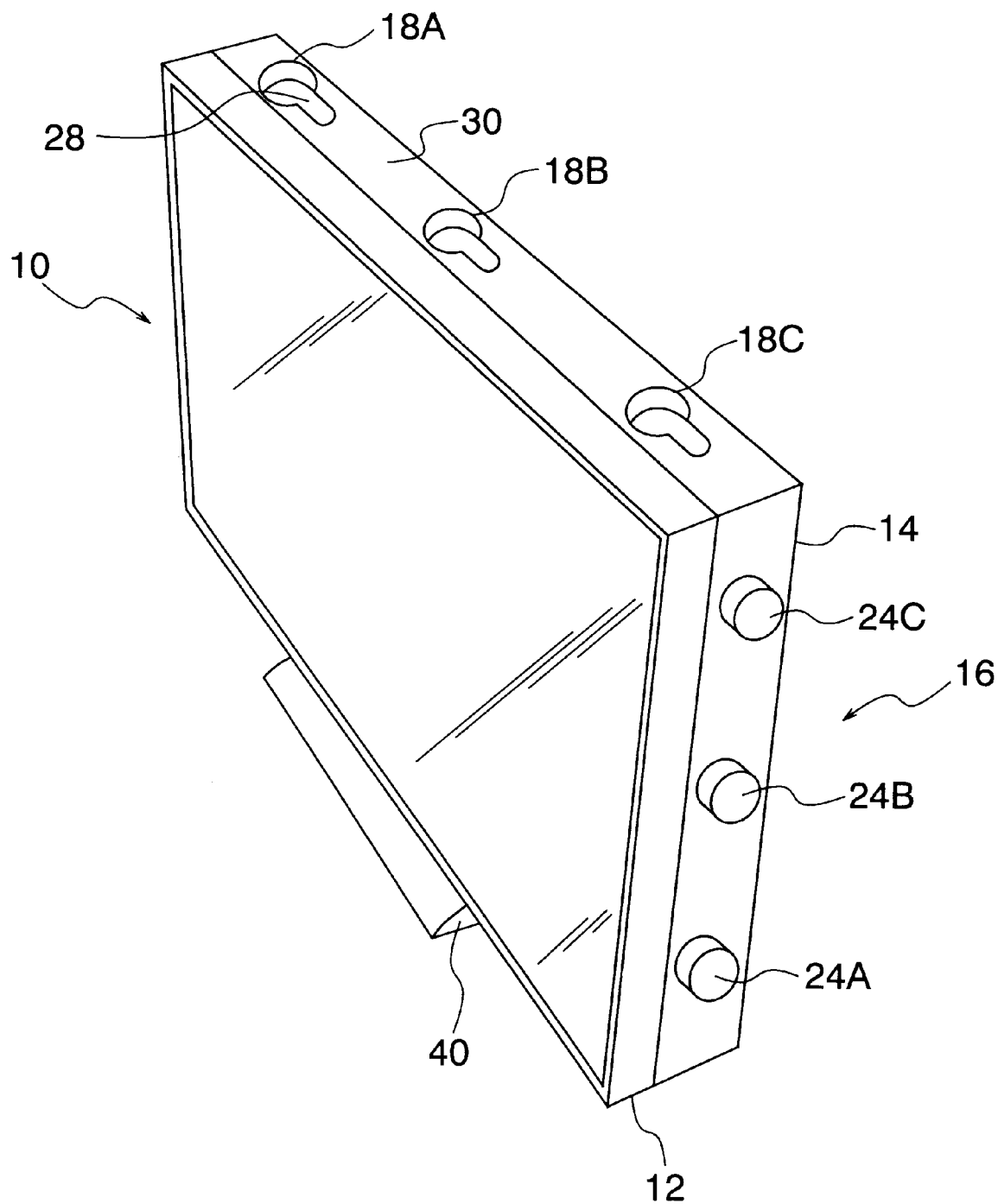
FIG. 3 is a perspective view of a liquid crystal display module according to an embodiment of the present invention.
Figure 4:
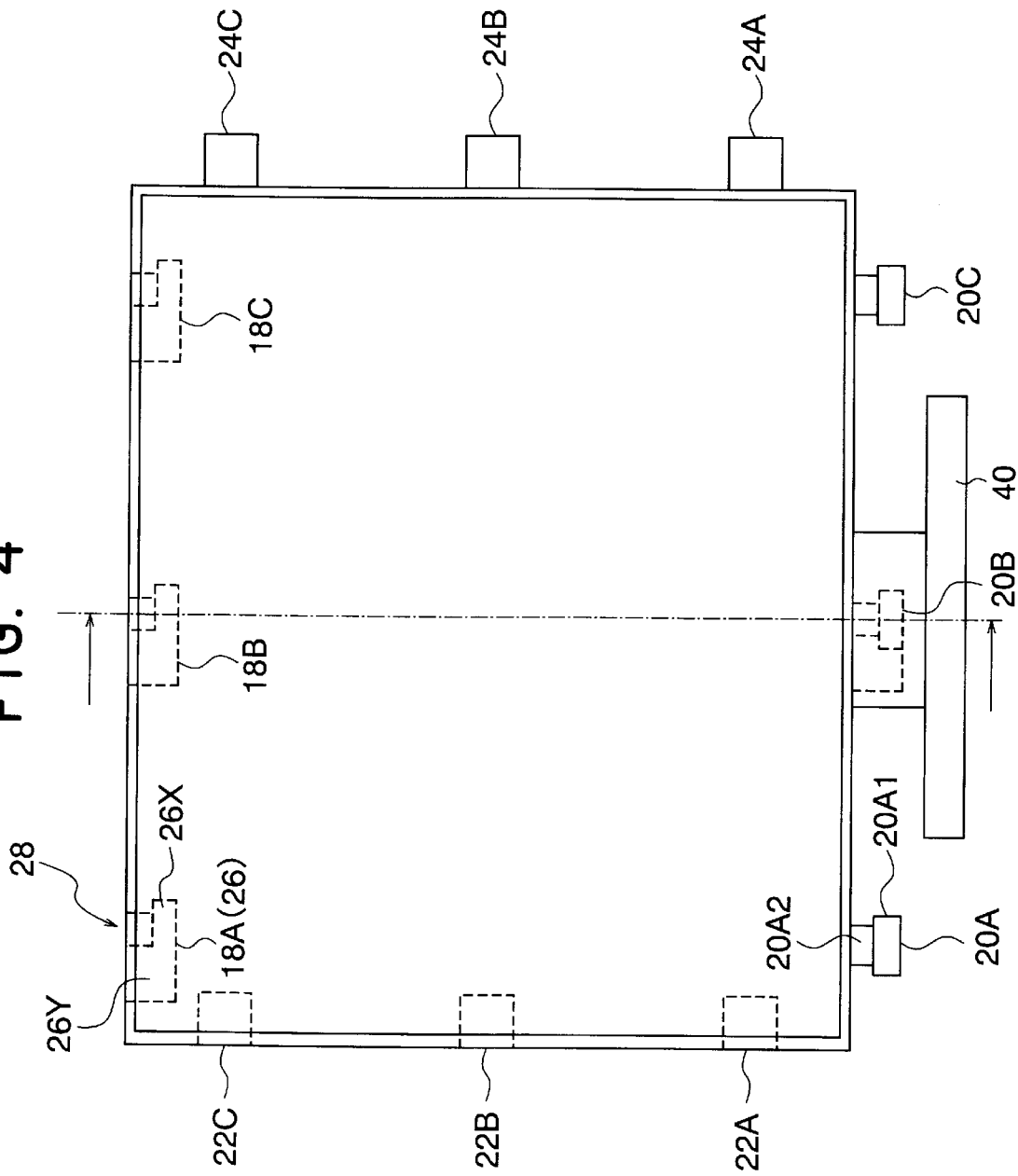
FIG. 4 is a front view of the liquid crystal display module of FIG. 3.

Referring to FIG. 3 and FIG. 4, a liquid crystal display module 10 according to the present embodiment is shown as mounted on a stand 40 for supporting the liquid crystal display module 10.

The liquid crystal display module 10 has a rectangular liquid crystal display panel 12 and a support panel 14 for supporting the liquid crystal display panel 12 on the rear surface of the liquid crystal display panel 12. The support panel 14 is made of, for instance, metallic materials such as aluminum and magnesium alloy, or recycled plastic materials such as polycarbonate (PC) and PC-ABS resin, and has a rectangular shape corresponding to the liquid crystal display panel 12. The support panel 14 has a locking mechanism 16 for coupling a plurality of liquid crystal display modules 10 together, and is made of, for instance, materials as mentioned above in connection with the support panel 14.

The locking mechanism 16 includes top holes 18A to 18C on the top side of the support panel 14, bottom projections 20A to 20C corresponding to the top holes 18A to 18C, respectively, on the bottom side of the support panel 14. The locking mechanism 16 also includes left holes 22A to 22C on the left side of the support panel 14 and right projections 24A to 24C on the right side of the support panel 14 corresponding to left holes 22A to 22C, respectively.

Figure 5:
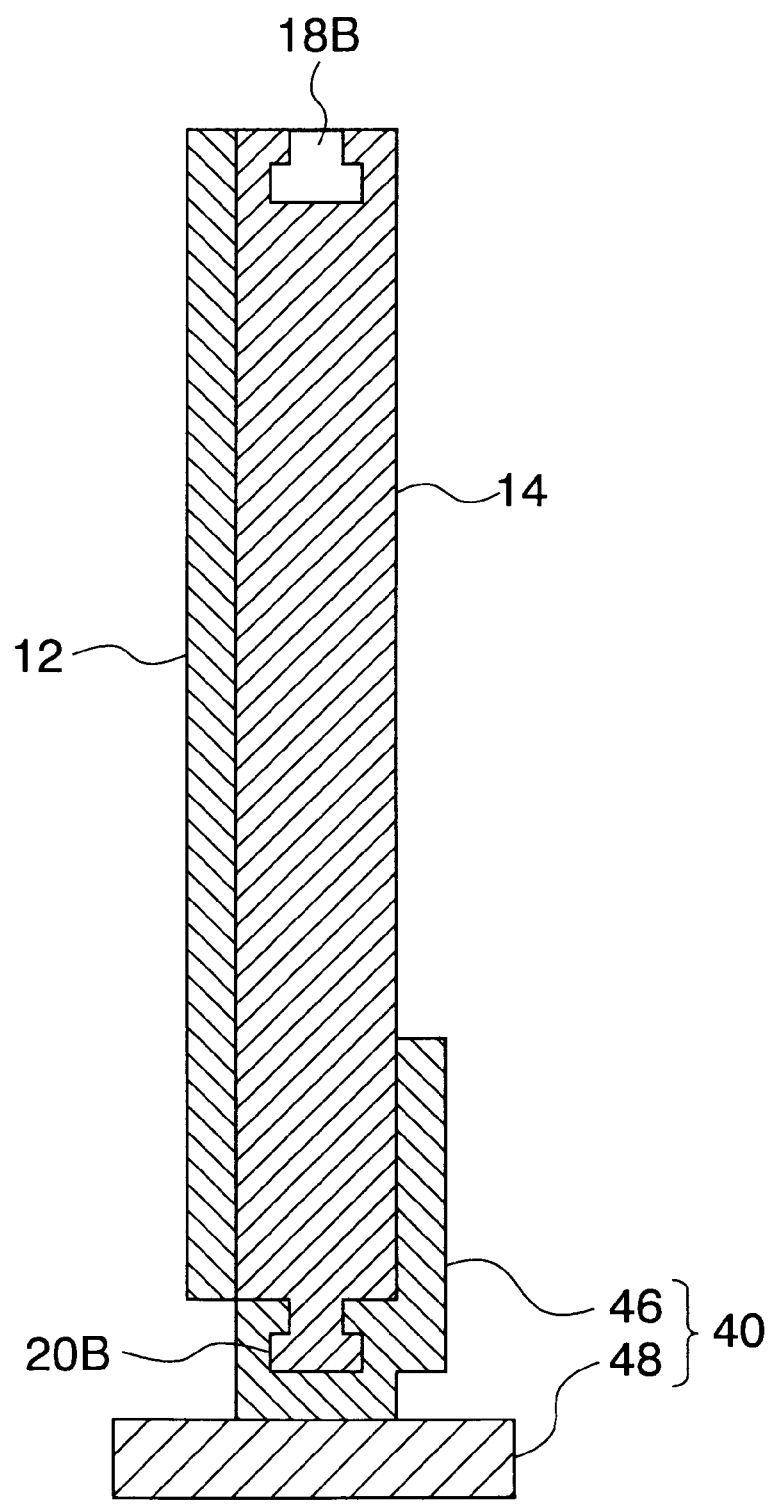
FIG. 5 is a vertical sectional view of the module taken along line V—V in FIG. 4.

The top holes 18A to 18C and the bottom projections 20A to 20C are adapted for locking to couple adjacent modules 10 in the vertical direction. The top holes 18A to 18C and the bottom projections 20A to 20C are shown in FIG. 5, wherein the cross-section of the holes and projections have a shape of letter "T".

The top holes 18A to 18C are disposed at an equal pitch, with the top hole 18B disposed at the center. The bottom projections 20A to 20C are disposed corresponding to the top holes 18A to 18C. The left holes 22A to 22C and the right projections 24A to 24C are also disposed at an equal pitch.

The bottom projection 20A, as shown in FIG. 4, has a locking disk 20A1 for engaging with the top hole 18A and a column protrusion 20A2 formed as a unitary body with the locking disk 20A1. The protrusion 20A2 has a diameter smaller than that of the locking disk 20A1. The shape of the bottom projections 20B and 20C is similar to that of the bottom projection 20A.

Figure 6:
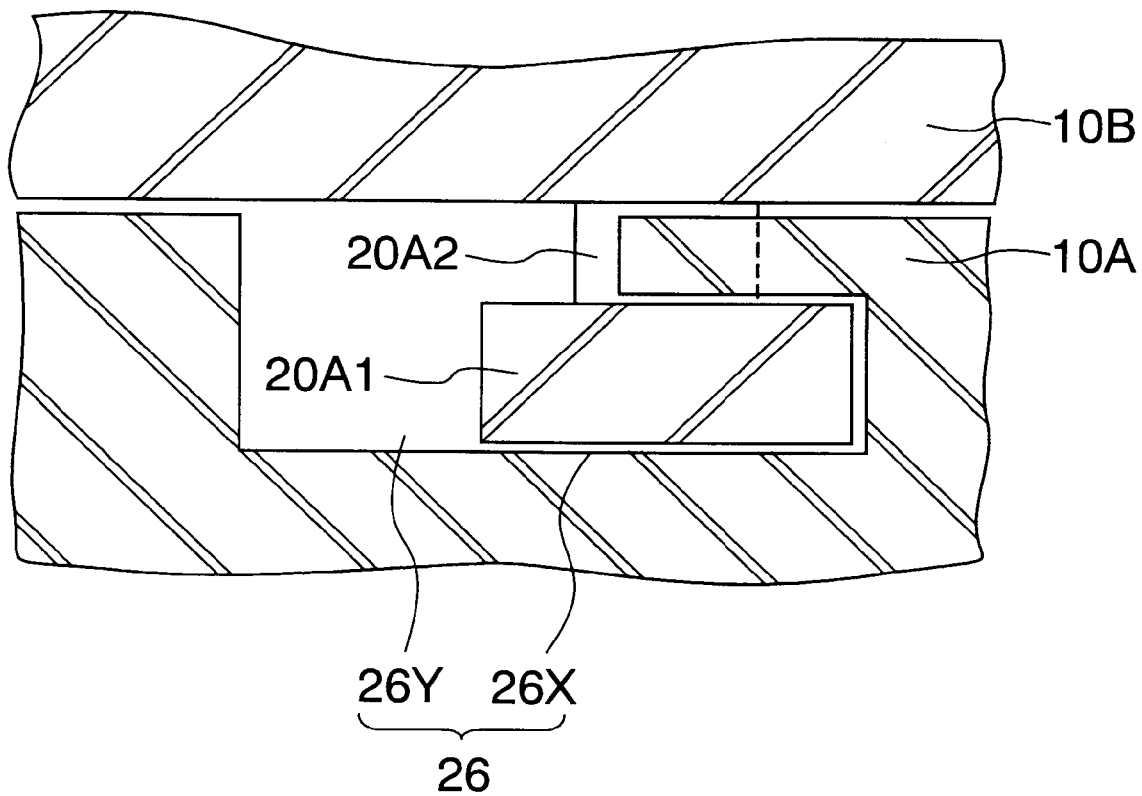
FIG. 6 is an enlarged sectional view of the bottom projection received in the top hole of another module for locking.

FIG. 6 is an enlarged sectional view of the bottom projection 20A engaged with the top hole 18A of another module. The top hole 18A is formed as a keyhole 26 for controlling the movement of the locking disk 20A1 by receiving therein the locking disk 20A1. The keyhole 26 has a longitudinal section 26Y and a transverse section 26X extending from the longitudinal section 26Y in the horizontal direction towards the right. The longitudinal section 26Y of a cylindrical shape having a diameter corresponding to the diameter of the locking disk 20A1 and having a depth a little larger than the thickness of the locking disk 20A1. The transverse section 26X has a depth and a width corresponding to the thickness and the diameter of the locking disk 20A1, respectively. The keyhole 26 has a guide slit 28 (FIG. 3) in the top surface of the support panel 14 for guiding the column protrusion 20A2 along the transverse direction of the keyhole 26. The locking disk 20A1 first advances along the longitudinal section 26Y and then slides along the transverse section 26X of the keyhole 26. The width of the guide slit 28 corresponds to the diameter of the column protrusion 20A2, whereas the thickness of the board 30 (FIG. 3) of the support panel 14 corresponds to the length of the column protrusion 20A2. The shape of the top holes 18B and 18C is similar to that of the top hole 18A.

The right projection 24A, as shown in FIG. 4, has a cylindrical shape, which corresponds to the shape of the left hole 22A. The shape of the right projection 24B is similar to that of the right projection 24A, and the shape of the right projection 24C is similar to that of the right projection 24A except for a notch mentioned later. The right projections 24A, 24B and 24C are disposed corresponding to the left holes 22A, 22B and 22C. When the bottom projections 20A to 20C are engaged with the top holes 18A to 18C, respectively, the right projections 24A to 24C engage with the left holes 22A to 22C, respectively.

Figure 7A:
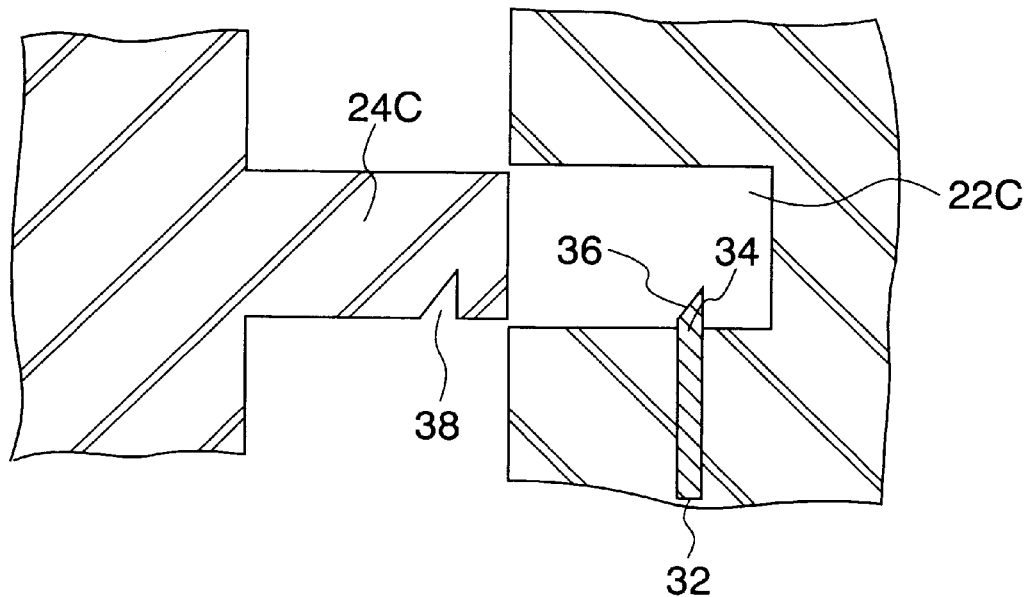
FIGS. 7A and 7B are enlarged sectional views of the right projection before and after locking, respectively.
Figure 7B:
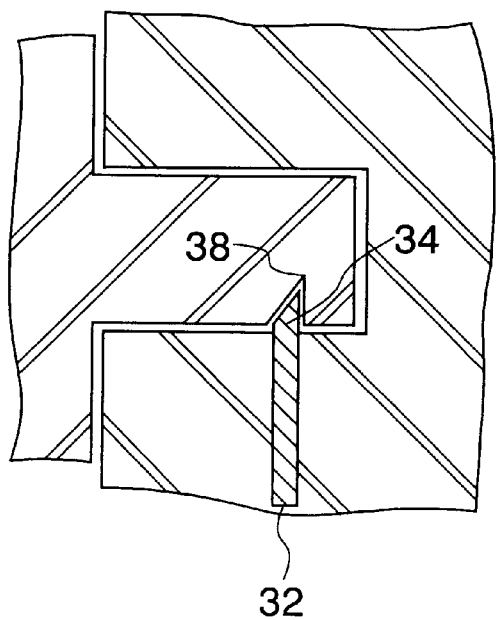

FIGS. 7A and 7B are enlarged sectional views of the right projection 24C before being locked with the left hole 22C and after locked with the same, respectively. The left hole 22C has therein a locking pin 32 which protrudes in the left hole 22C for engaging with the right projection 24C. The tip 34 of the locking pin 32 has a slope 36 rising toward the bottom of the left hole 22C. The right projection 24C has a notch corresponding to the tip 34 of the locking pin 32. The locking pin 32 is urged by a spring (not shown) upward to engage the right projection 24C with the left hole 22C after the right projection 24C advances to the right end.

Figure 8:
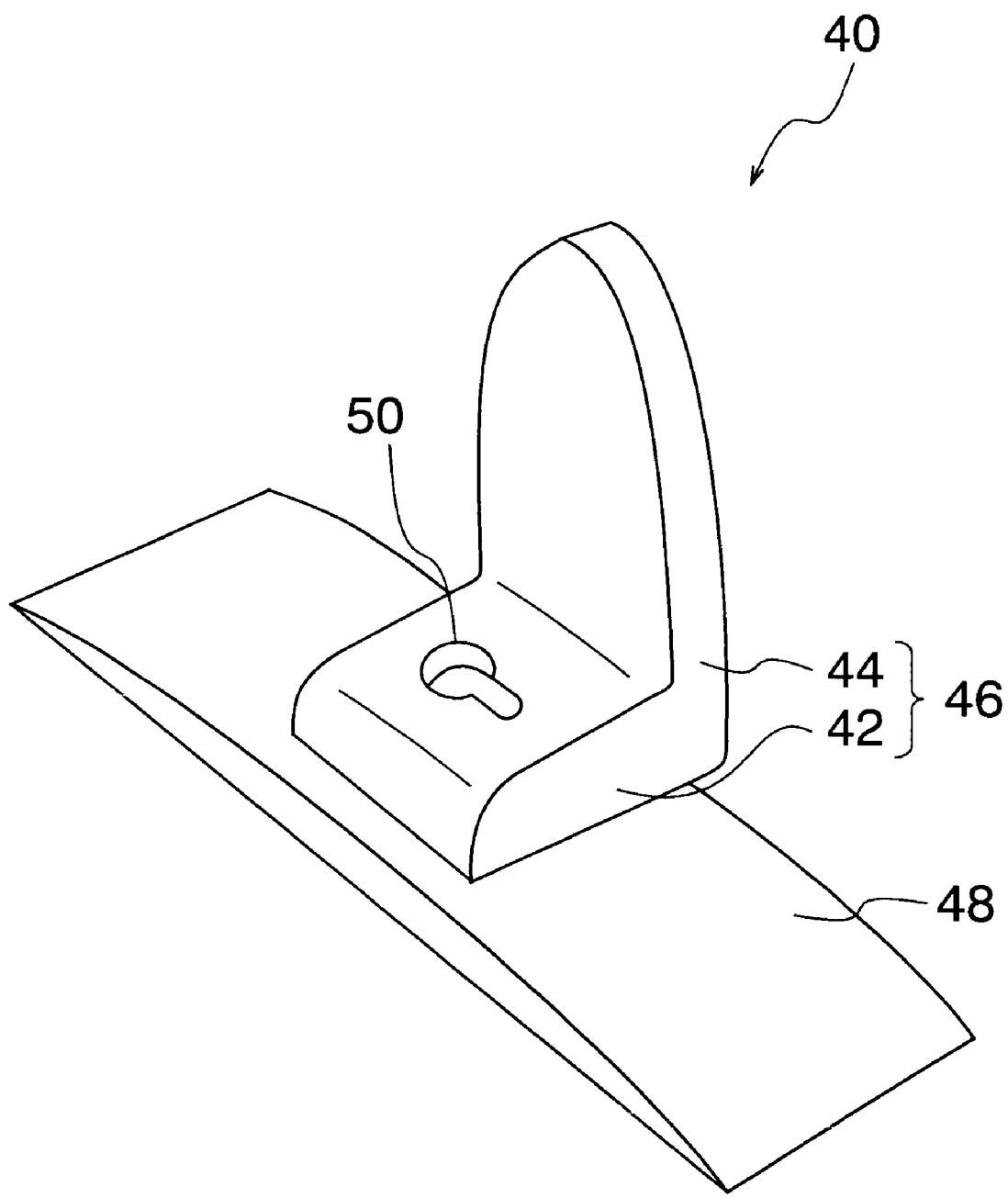
FIG. 8 is a perspective view of a stand for use in the liquid crystal display module of the embodiment.

Referring to FIG. 8 showing the stand 40 for the liquid crystal display module 10, the stand 40 has a coupler 46 in the shape of letter "L" as viewed from the side. The stand 40 has a bottom support section 42 for supporting the bottom of the support panel 14 on the top surface of the bottom support section 42 and a back support section 44 for supporting the rear side of the support panel 14. The stand 40 further has a leg 48 coupled to the bottom support section 42 of the coupler 46. The bottom support section 42 has a hole 50 having a shape similar to the shape of the top hole 18A.

The liquid crystal display panel 12 of the module 10 is implemented as a 14-inch commercial TFT type high resolution liquid crystal display panel. The liquid crystal display panel 12 has a high view angle and a small non-display area on the periphery of the liquid crystal display panel 12. That is, the liquid crystal display panel 12 has a small frame width.

Figure 9:
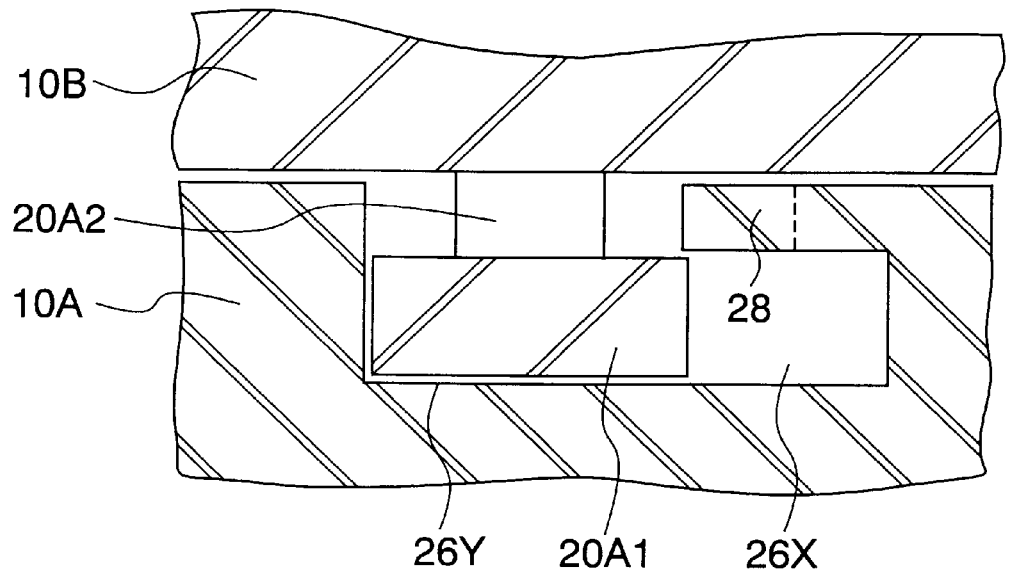
FIGS. 9A and 9B are enlarged sectional views of the bottom projection of the liquid crystal display module before and after locking, respectively.
Figure 9:
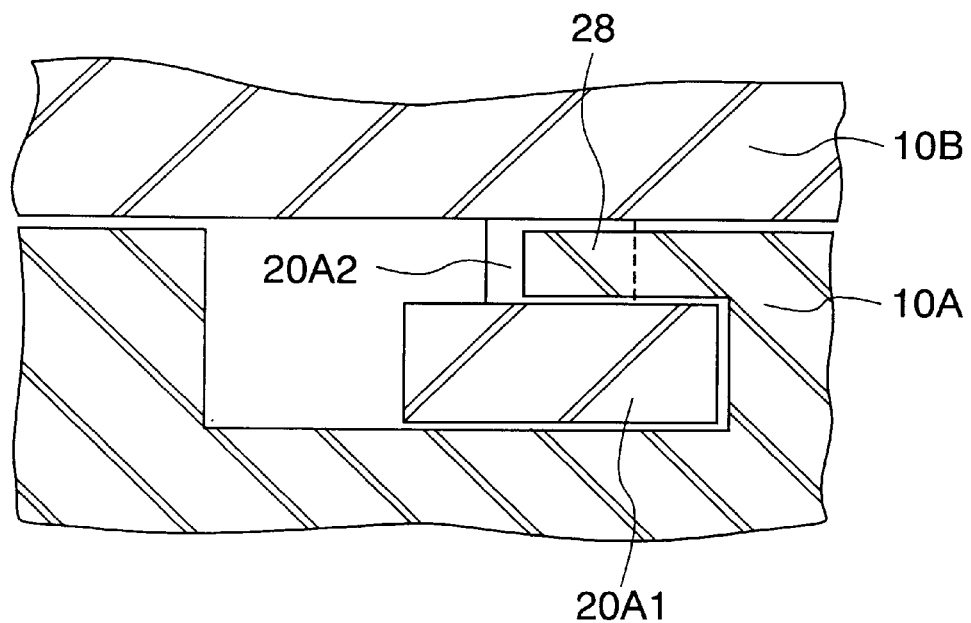

Now, a method for coupling a liquid crystal display module 10A to a liquid crystal display module 10B, both according to the embodiment described heretofore, in the vertical direction will be described. Similar constituent elements of the liquid crystal display module 10B are designated by the same or similar reference numerals of the liquid crystal display module 10A. FIGS. 9A and 9B are enlarged sectional views of the liquid crystal display module 10A and the liquid crystal display module 10B, showing engagement of the bottom projection 20 with the top hole 18.

For coupling the liquid crystal display module 10B to the top side of the liquid crystal display module 10A, as shown in FIG. 9A, the bottom projections 20A to 20C of the liquid crystal display module 10B are first inserted into the longitudinal sections 26Y of the top holes 18A to 18C of the liquid crystal display module 10A, respectively. The liquid crystal display module 10B is then slidden toward the right relative to the liquid crystal display module 10A, that is, in the extending direction of the transverse section 26X of the top hole 26. As a result, as shown in FIG. 9B, the locking disk 20A1 moves toward the end wall of the transverse section 26X and the column projection 20A2 abuts against the right end of the guide slit 28. At this stage, the bottom projection 20 is locked with the top hole 26 by a slight taper end of the transverse section 26X, for example, thereby coupling the liquid crystal display module 10B to the liquid crystal display module 10A.

For coupling the liquid crystal display module 10B to the liquid crystal display module 10A disposed on the left side of the module 10B, the right projections 24A to 24C of the liquid crystal display module 10B are inserted into the left holes 22A to 22C of the liquid crystal display module 10A, respectively. As a result, the right projections 24A to 24C are locked with the left holes 22A to 22C, respectively, as shown in FIG. 7B, by the locking pin 32 of the left hole 22C engaging with the notch 38 of the right projection 24C.

Figure 10:
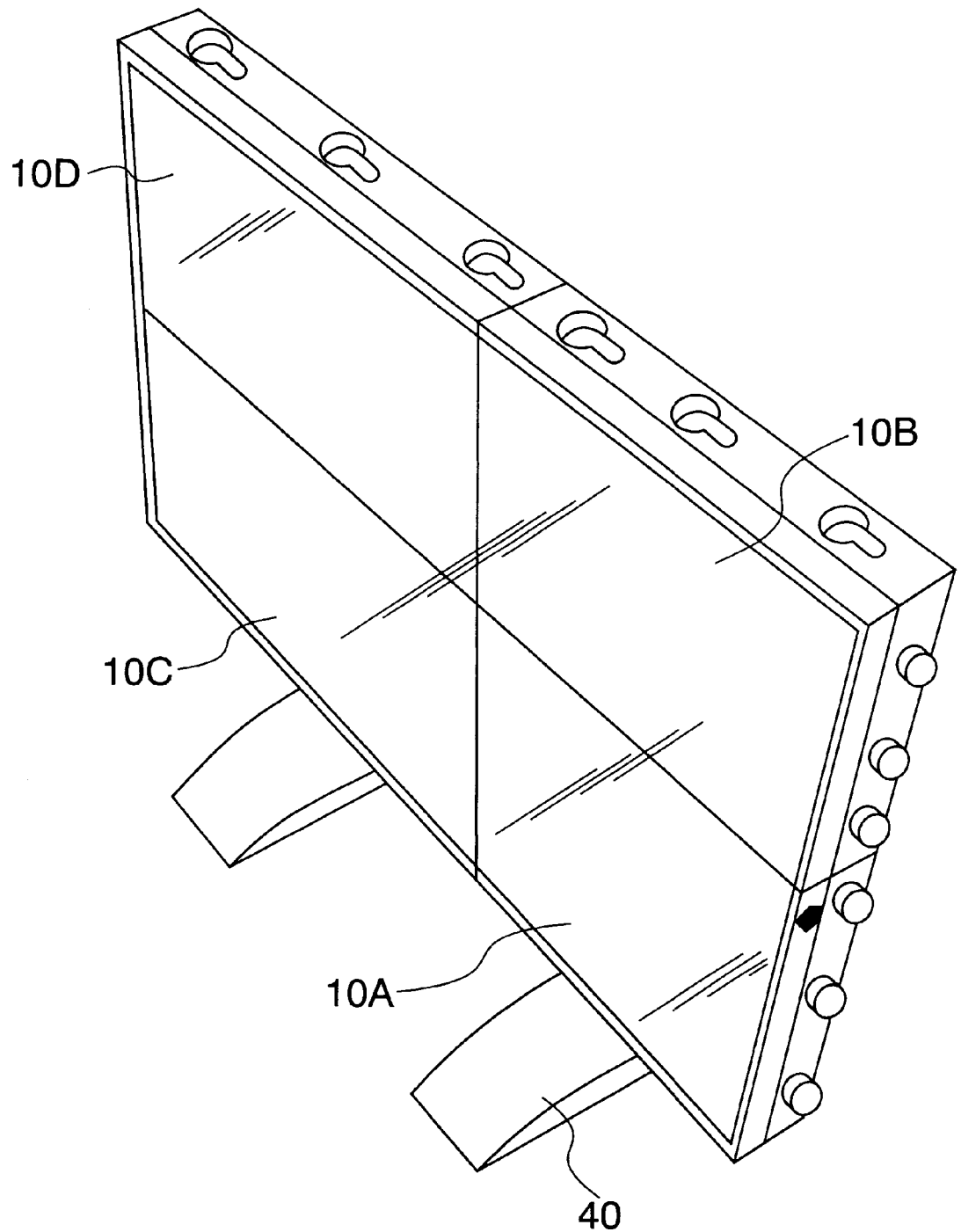
FIG. 10 is a perspective view of a large screen display panel fabricated by coupling the liquid crystal display modules of the embodiment.
Figure 11:
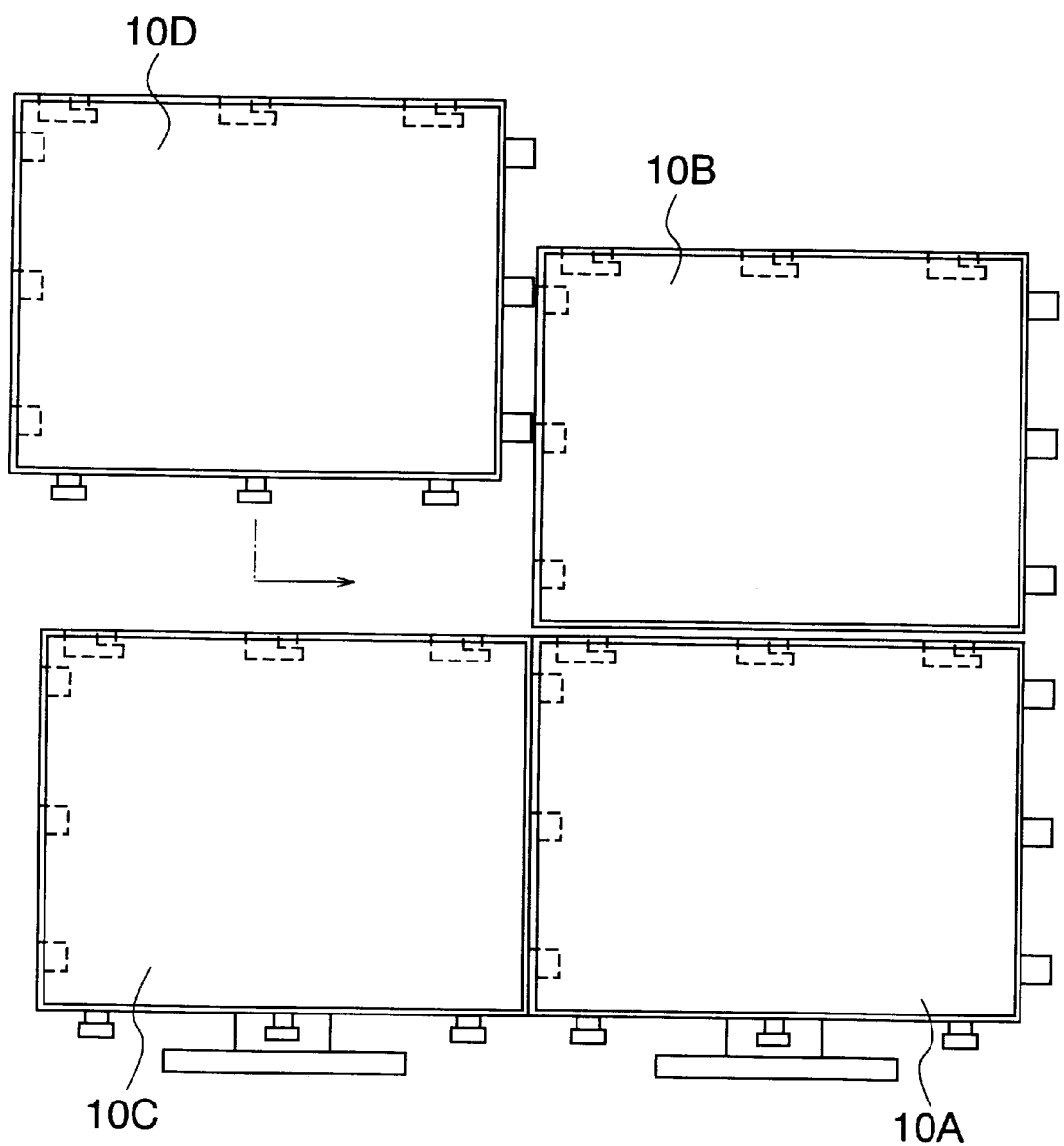
FIG. 11 is a front view of the large screen display panel of FIG. 10 during coupling of display modules.

Referring to FIG. 10, a plurality of liquid crystal display modules having the configuration described above are coupled together to implement a large screen display device. For coupling the liquid crystal display modules 10A to 10D of the similar shape as shown in FIG. 10, the liquid crystal display module 10B is first coupled to the liquid crystal display module 10A disposed on the bottom side of module 10B, the liquid crystal display module 10C is then coupled to the left side of the liquid crystal display module 10A. FIG. 11 shows the modules at this stage of the coupling wherein three liquid crystal display modules 10A to 10C are coupled together. The bottom projections of the liquid crystal display module 10D are then inserted into the longitudinal sections 26Y of the top holes 26 of the liquid crystal display module 10C, and then slidden to the right toward the liquid crystal display module 10B. As a result, the coupled state shown in FIG. 10 is achieved, that is, the liquid crystal display modules 10A to 10D are locked together with a sufficient strength to form a single large screen display device.

The large screen liquid crystal display device thus implemented can be used as a single display device after electric coupling using known electric connection techniques or connectors for transmitting electric signals to each module. The electric connectors can be disposed adjacent to the holes or projections to thereby couple the connectors when the modules are coupled together using the holes and the projections. The support panel may be used for receiving therein LCD drivers or computer board. The computer board may be a multi monitor graphic board generally used in the CRT monitor.

For removing a specific liquid crystal display module from the large screen display device for replacement, the locking pin 32 is lowered to retract the pin 32 from the notch 38 of the right projection, then the liquid crystal display module is slidden in the direction opposite to the direction for coupling.

The central bottom projection 20B among the bottom projections 20A to 20C of the liquid crystal display module 10A is inserted into the longitudinal section of the stand hole 50 for coupling the stand 40 to the liquid crystal display module 10A. The liquid crystal display module 10B is slidden to the right relative to the stand 40 in FIG. 10, that is, in the extending direction of the transverse section of the stand hole 50. As a result, the liquid crystal display module 10A and the stand 40 are locked together with a sufficient strength. When two or more of liquid crystal display modules are to be horizontally cascaded, as shown in FIG. 10, it is preferable to use a plurality of stands 40 corresponding to the number of the liquid crystal display modules. In addition, from the viewpoint of stability for prevention of the panel from falling, it is preferable to orthogonalize the longitudinal direction of the leg 48 to the surface of the liquid crystal display modules by turning the leg 48 of the stand 40.

The present embodiment provides the following advantages:

(1) It facilitates to lock the liquid crystal display modules of the similar shape together by a sufficient strength without using a specific tool and to remove a specific module for repair or replacement from the locked modules;

(2) It is possible to reuse the liquid crystal display module removed from a large screen display device as a single display device by installing the removable stand 40, which can be installed and removed without a tool;

(3) It is possible to adjust the size of the large screen display device based on the space therefor;

(4) It facilitates scrapping of a large screen display device by decoupling the modules;

(5) The plurality of top holes, left holes, bottom projections and right projections facilitate coupling the liquid crystal display modules together to achieve a stable state of the fabrication;

(6) The structure of locking disk and the coupler of the bottom projections 20A to 20C can be formed in unitary body with the support panel 14, which reduces the number of parts required.

Although the shape of the bottom projections 20A to 20C is different from the shape of the right projections 24A to 24C in the above embodiment, if the inner diameter of the left hole 22 is the same as that of the top hole 18, the shape of the right projection 24 may be same as that of the bottom projection 20. The right projections 24A and 24B may have a notch similar to the notch 38. The left holes 22A and 22B may have a locking pin similar to the locking pin 32.

The present invention is described according to the above preferable embodiment, however, the method for manufacturing the semiconductor device of the present invention does not limit to the above embodiment, but includes the modified and varied examples based on the above embodiment. For example, the liquid crystal display module may be replaced by any flat panel display panel such as a plasma display panel.

What is claimed is:

1. A flat panel display module comprising a display panel and a support panel disposed for a rear side of said display panel for supporting said display panel, said support panel having a coupling mechanism including at least one first projection fixed onto a first side of said support panel and at least one first hole disposed on a second side of said support panel opposing said first side for receiving therein said first projection.

2. The flat panel display module as defined in claim 1, wherein said support panel has a rectangular shape, and said coupling, mechanism includes at least one second projection fixed onto a third side of said support panel and at least one second hole disposed on a fourth side of said support panel opposing said third side for receiving said second projection.

3. The flat panel display module as defined in claim 2, wherein said first hole has a longitudinal section extending perpendicular to said first side for receiving said first projection, and a transverse section extending from said longitudinal section parallel to said first side for guiding said first projection to lock said first projection with said transverse section of said hole.

4. The flat panel display module as defined in claim 3, wherein said second hole has an inner shape corresponding to an outer shape of said second projection, and a pin urged to protrude from an inner surface of said second hole in a direction substantially parallel to said third side for locking and unlocking said second projection with said second hole.

5. The flat panel display module as defined in claim 4, wherein a length for guiding said first projection along said transverse section of said first hole corresponds to a length of said second hole.

6. A large scale flat panel display device comprising a plurality of flat panel display modules each including a display panel and a support panel disposed for a rear side of said display panel for supporting said display panel, said support panel having a coupling mechanism including at least one first projection fixed onto a first side of said support panel and at least one first hole disposed on a second side of said support panel opposing said first side for receiving therein said first projection.

7. The large scale flat panel display device as defined in claim 6, wherein said support panel has a rectangular shape, and said coupling mechanism includes at least one second projection fixed onto a third side of said support panel and at least one second hole disposed on a fourth side of said support panel opposing said third side for receiving said second projection.

8. The large scale flat panel display device as defined in claim 7, wherein said first hole has a longitudinal section extending perpendicular to said first side for receiving said first projection, and a transverse section extending from said longitudinal section parallel to said first side for guiding said first projection to lock said first projection with said transverse section of said hole.

9. The large scale flat panel display device as defined in claim 8, wherein said second hole has an inner shape corresponding to an outer shape of said second projection, and a pin urged to protrude from an inner surface of said second hole in a direction substantially parallel to said third side for locking and unlocking said second projection with said second hole.

10. The large scale flat panel display device as defined in claim 9, wherein a length for guiding said first projection along said transverse section of said first hole corresponds to a length of said second hole.

11. The large scale flat panel display device as defined in claim 7, further comprising at least one stand for supporting said display device, said stand having a third hole or third projection disposed on a top surface thereof, said third hole or said third projection having a shape similar to a shape of said first hole or said first projection.

* * * * *